Jan. 26, 1965   J. J. BAGNALL, JR., ETAL   3,167,772
COLLISION AVOIDANCE SYSTEM
Filed July 23, 1962   8 Sheets-Sheet 1
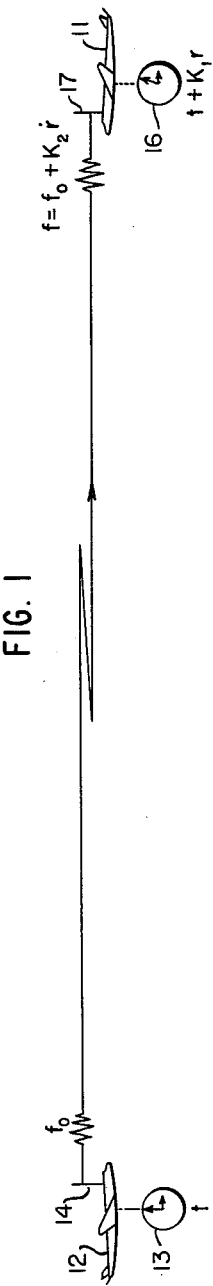
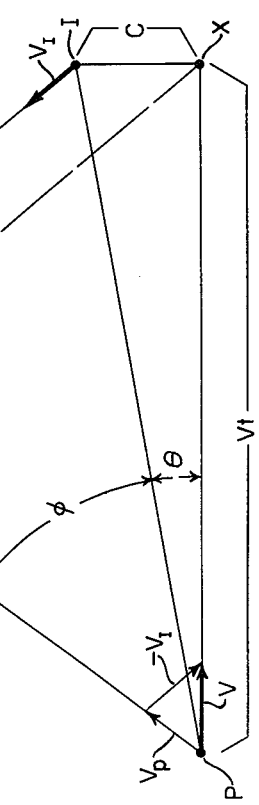
INVENTORS
JAMES J. BAGNALL, JR.
LAWRENCE F. FENTON
BY
Kenway, Jenney & Hildreth
ATTORNEYS

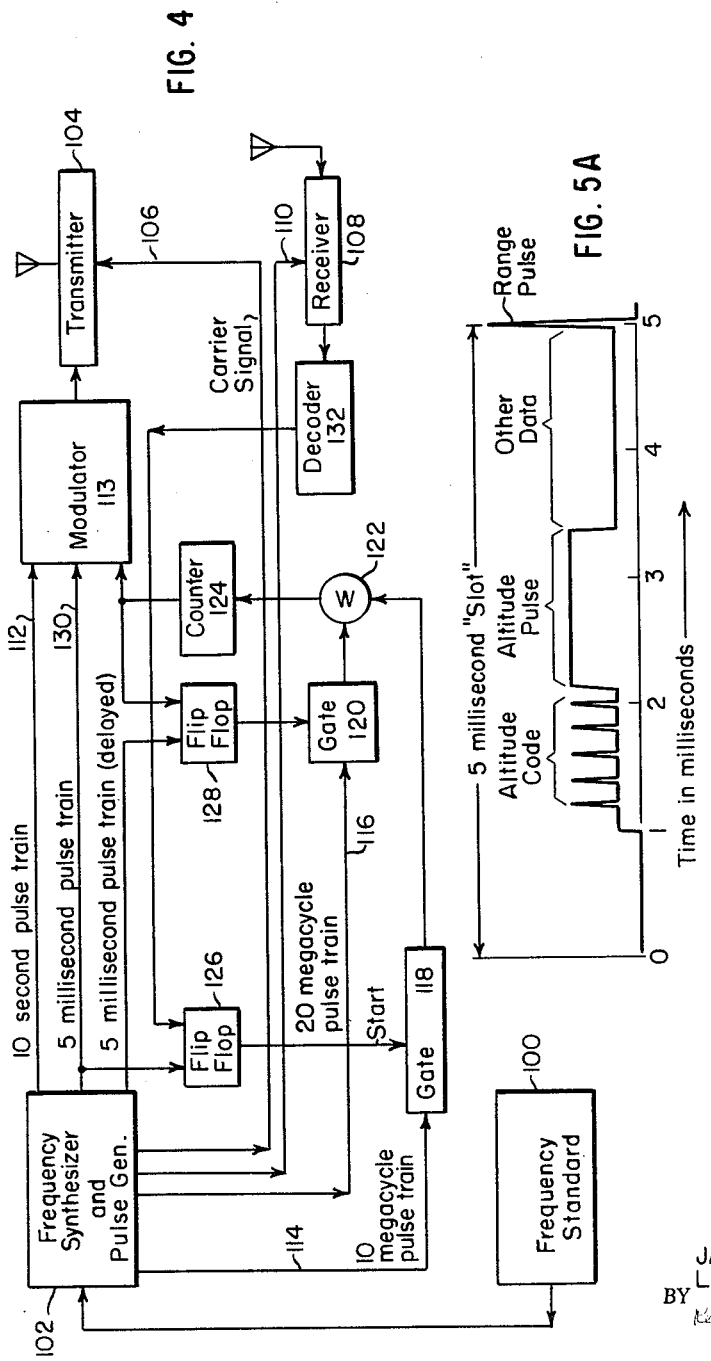

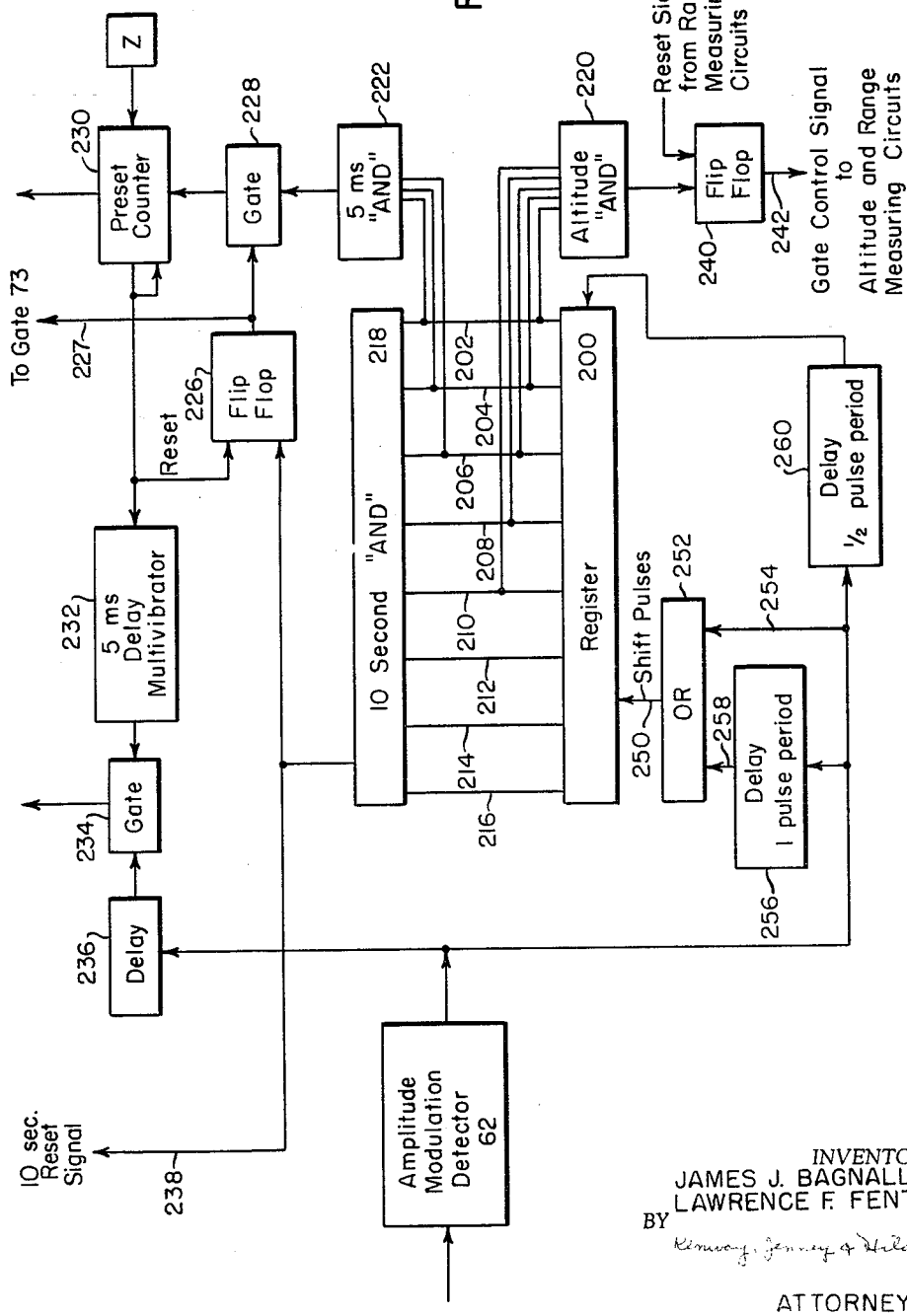

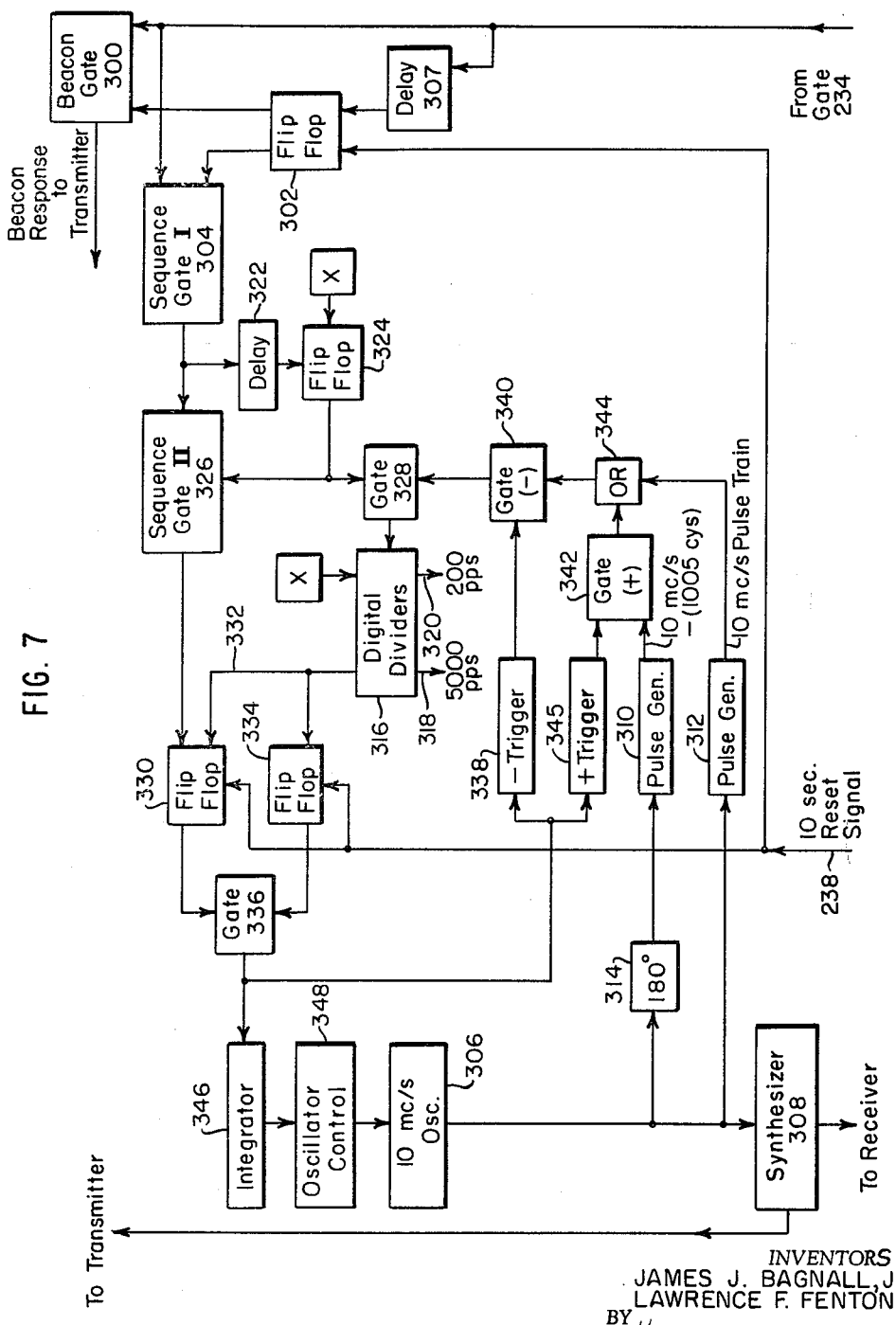

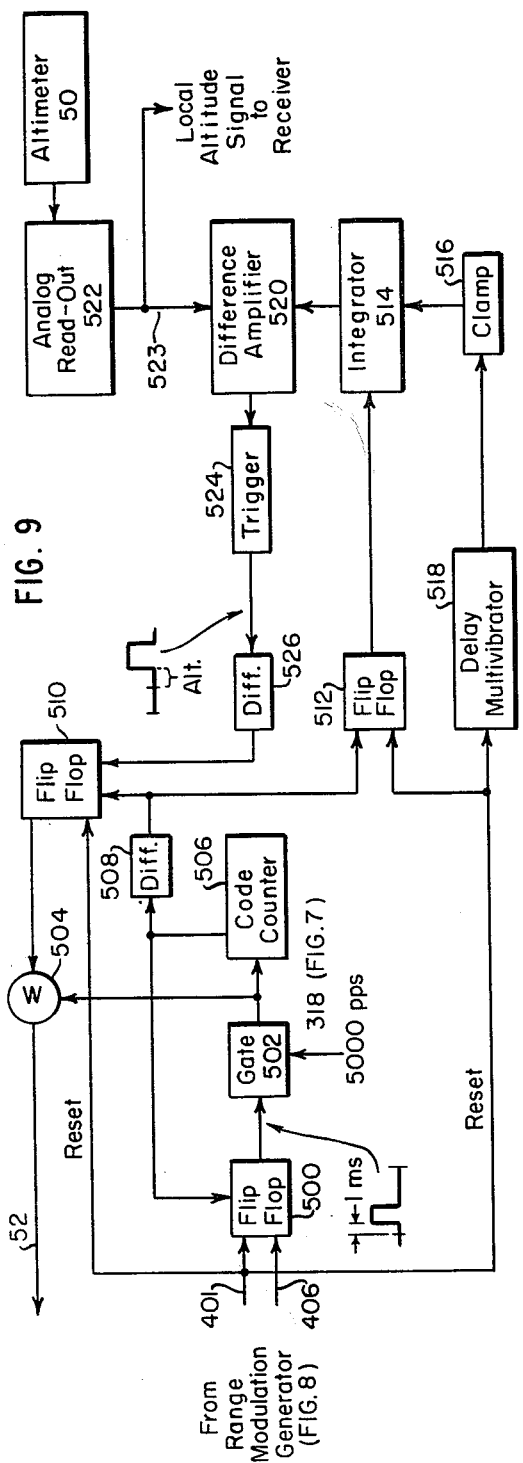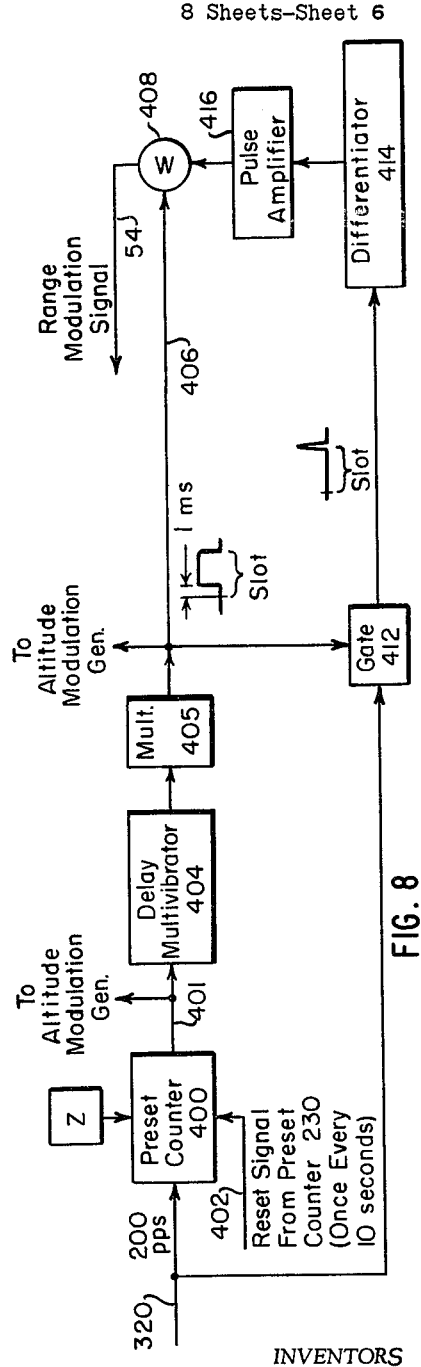

INVENTORS
JAMES J. BAGNALL, JR.
LAWRENCE F. FENTON
BY Kenway, Jenney & Hildreth
ATTORNEYS

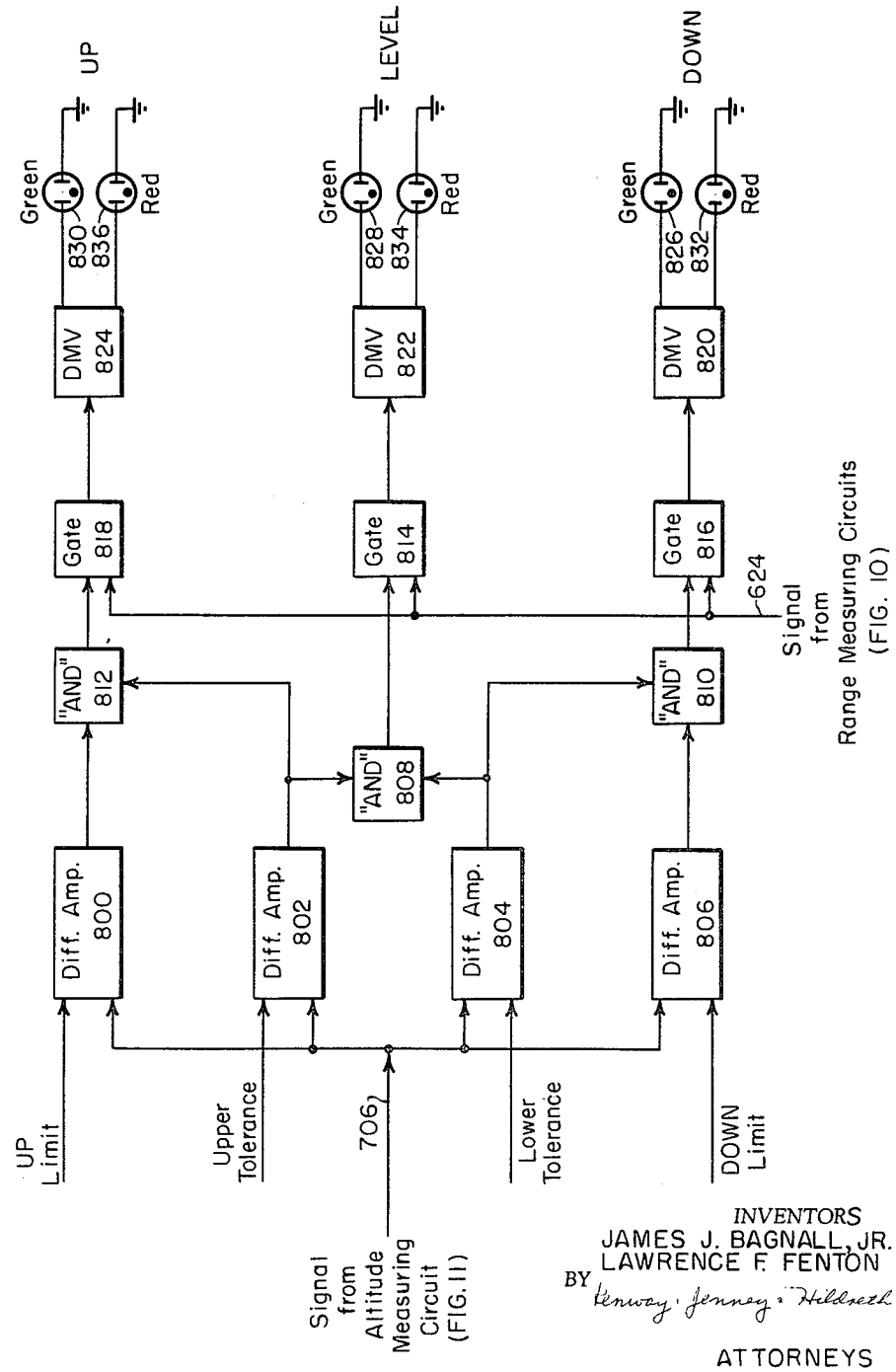

United States Patent Office 3,167,772
Patented Jan. 26, 1965

3,167,772
COLLISION AVOIDANCE SYSTEM
James J. Bagnall, Jr., Arlington, and Lawrence F. Fenton, Malden, Mass., assignors to National Company, Inc., Malden, Mass., a corporation of Massachusetts
Filed July 23, 1962, Ser. No. 211,603
18 Claims. (Cl. 343—112)

This invention is concerned with a collision avoidance system for moving vehicles, for example aircraft and more particularly is concerned with airborne apparatus to warn of an impending collision between two aircraft and to predict the evasive action that should be taken. Additionally the system of the invention provides means for collecting data for navigation, air traffic control and related systems.

As is well known, the hazard of air collisions is daily increasing as a result of increased air traffic and air speed, so that the need for a reliable collision avoidance system is now or very shortly will be crucial. A seemingly obvious solution to the problem is airborne radar. However, radar equipment which can reliably provide the required warning in sufficient time for evasive action to be taken is both heavy and bulky. A more basic problem that is encountered with radar as a collision avoidance device is the practical impossibility of achieving the full spherical scan that is desirable to protect against collision threats from all directions. Even assuming that this were possible, it still remains to provide some practical and reliable means for evaluating radar target data in terms of collision possibilities, a not inconsiderable problem in itself owing to the constraints imposed by an airborne environment.

Because airborne radar cannot provide a practical and useful collision avoidance system, other systems have heretofore been proposed. Among these are systems which provide transmitting equipment aboard the "protected" aircraft which broadcasts interrogating pulses. Each "intruder" aircraft is provided with a receiver and a beacon transmitter. When the receiver in the intruder aircraft receives interrogating pulses from the protected aircraft it operates the beacon, which then transmits a signal which is in turn received in the protected aircraft. From the time of transmission of its own pulse and the time of reception of pulses from the beacon, the protected aircraft can determine the range and by measuring the range over a period of time can also ascertain range rate to the intruder.

The major disadvantage of this system is that every aircraft which might constitute a collision threat must respond to all interrogating pulses from all protected airplanes. In a dense traffic area, where every aircraft is both interrogating and responding, a very large number of transmissions take place. This increases substantially the probability of interference and the garbled reception of signals.

To obviate these difficulties it has been previously proposed to use a so-called "ground bounce" system in conjunction with several criteria for measuring the threat of collision. The system, using these criteria which are also used in the present invention, is known as the tau ($\tau$) system. In practice three different criteria are used, altitude, escape time and minimum range. Thus, if an intruder aircraft is flying at an altitude substantially above or below the protected aircraft, it may be disregarded as a potential threat, since no collision can occur. The second criteria depends on a measurement of escape time i.e. the time to the instant of closest approach if no escape maneuver is undertaken. It is difficult to actually measure this time from the protected aircraft. Instead, an approximation of the escape time is determined. This approximation may be defined as the ratio of the range between protected and intruder aircraft to the range rate, i.e.

$$\tau = \frac{r}{\dot{r}}$$

where $r$ is range and $\dot{r}$ is the range rate. Although $\tau$ is a good measure of the collision danger for fairly rapid changes in range, for low values of range rate it is not critical. Accordingly, the $\tau$ system utilizes as an additional criterion, minimum range. When the measured value of $\tau$ or the measured range drops below a minimum value, any system based on these criteria should indicate an impending collision if the aircraft are appropriately at the same altitude.

From the foregoing, it is apparent that to evaluate the possibility of a collision with an intruder a protected aircraft requires three pieces of information with respect to it:

(1) range ($r$)

(2) range rate ($\dot{r}$); and (3) altitude

This information may be obtained by the radar or beacon systems previously described. However, it is possible and advantageous to obtain the information for collision evaluation by one way transmissions from the intruder to the protected aircraft.

As noted, a system that has been proposed for measuring range and range rate between a pair of aircraft is the "ground bounce" system described in U.S. Patent No. 2,837,738, dated June 3, 1958. In the ground bounce system, the difference in the times of arrival of the intruder's signal after traversing two different paths is measured aboard the protected aircraft. That portion of the pulse energy which radiates generally downwardly from the intruder and is reflected from earth back towards the protected aircraft defines one of the paths. The other path is defined by the line of sight between the craft. If the protected aircraft knows its own altitude, and the elevation angle or the altitude of the intruder it can determine range from the measured values. It has heretofore been proposed to use the ground bounce system to instrument the tau system. A major disadvantage of this scheme however, is that the signal to noise ratio in the performance of the $\tau$ and range evaluation is poor and is also a function of the terrain. Although the ground bounce technique of range measurement does not result in a practical implementation of the $\tau$ system, since the necessary data are not obtained with the required accuracy and reliability, the $\tau$ system itself is a very effective means for evaluating collision threats between aircraft.

It is a principal object of our invention to provide an improved system for warning an aircraft in flight of an impending collision with another aircraft.

Another object of our invention is to provide a system of the type described in which each aircraft in the system transmits to every other aircraft in the system information from which the collision threat it poses can be evaluated by the receiving or protected aircraft.

A further object of our invention is to provide a system of the type described capable of handling a plurality of aircraft simultaneously.

A still further object of our invention is to provide airborne equipment for a system of the type described which is simple and relatively compact in construction, has relatively few adjustments and provides an indication of impending collision which is accurate and unambiguous.

Yet a further object of our invention is to provide a system of the type described which not only provides an indication of impending collision at the altitude of the protected aircraft, but also indicates whether it is safe to evade the threatened collision by climbing or diving.

A still further object of our invention is to provide a system of the type described which utilizes the $\tau$ criterion for evaluating the collision threat.

Other and further objects of our invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a pictorial illustration useful in explaining the general principles of our invention;

FIG. 2 is a vector diagram useful in explaining the $\tau$ criterion;

FIG. 4 is a block and line diagram of a portion of the equipment located at a central ground station and transmitting to all aircraft in the system in its vicinity;

FIG. 5a is a diagram illustrating the waveform transmitted by an aircraft to all other aircraft in the system;

FIG. 5b is a diagram illustrating the pulse sequences transmitted by the ground station of FIG. 4;

FIG. 6 is a detailed block and line diagram of the decoding portion of the airborne equipment used in the system of our invention;

FIG. 7 is a detailed block and line diagram of the beacon response and synchronizing equipment used in the airborne equipment of our invention;

FIG. 8 is a detailed block and line diagram of airborne apparatus for generating the range modulation signal useful in the system of our invention;

FIG. 9 is a block and line diagram illustrating apparatus for generating the altitude modulation signal in the airborne apparatus of our invention;

FIG. 12 is a block and line diagram of the computation and indication sections of airborne apparatus useful in the system of our invention.

Figure 3:
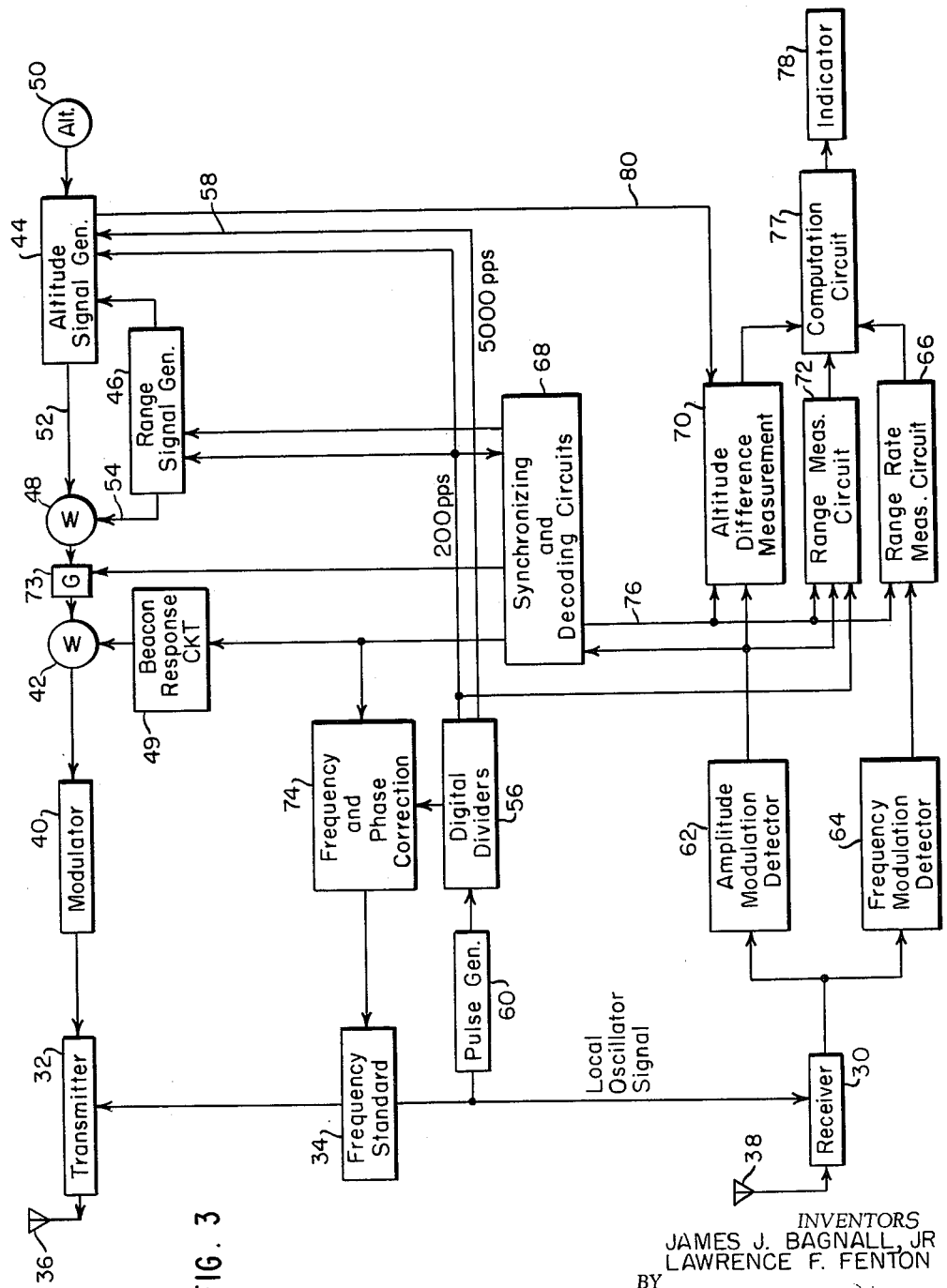
FIG. 3 is a generalized block and line diagram of airborne equipment for use in the system of our invention.

With reference first to FIG. 1 it will be observed that the numeral 11 designates an aircraft which is to be apprised of a collision threat by an intruder aircraft 12. Carried aboard the intruder aircraft, is a transmitter (not shown in FIG. 1) for broadcasting a modulated electromagnetic signal, e.g. pulses at recurrent predetermined intervals determined by a local clock 13. The local clock 13 in the intruder aircraft is driven by a constant radio frequency source. The pulses are radiated from the intruder aircraft by an antenna 14. Aboard the protected aircraft is a receiver (not shown in FIG. 1) connected to an antenna 17 responsive to the pulses from the intruder and a local clock 16 which is set to the same time and has the same rate as the intruder clock. The clock in the protected aircraft provides an indication of the times of arrival of the pulses.

The intruder pulses are transmitted at predetermined times known to the protected aircraft; since speed of propagation is constant, the time of arrival of the pulses at the protected aircraft provides an accurate indication of the transmission path length which is the range between intruder and protected aircraft.

It will be noted that the accuracy of this range measurement depends upon the two clocks, one in the intruder and one in the protected aircraft keeping the same time. To achieve the necessary accuracy in range measurement for a practical system, free running conventional crystal controlled oscillators could not be used to provide the necessary timing signals. Because of inherent frequency error between two such oscillators and because of drift, especially in an airborne environment, the two oscillators, unless periodically corrected to a standard, would soon be so far different that there would be little possibility of accurate range measurement.

However, in the system of this invention it is contemplated that the time standard will be one dependent on an atomic or molecular resonance. Such standards are substantially drift free and have an extremely high inherent accuracy i.e. two different standards using the same atomic or molecular resonance will have very closely the same frequency. Instead of such a standard some other established reference can be used, such as that provided by the Loran C system for example.

Standards or clocks based on a particle resonance may be carried directly in the protected and intruder aircraft, or alternatively, high quality crystal controlled oscillators whose frequency may be adjusted may be provided. Oscillators of this latter type would require periodic synchronization with an atomic or molecular resonance standard to maintain the desired frequency.

Since an accurate time and frequency standard is provided in both intruder and protected aircraft, not only range may be measured but also range rate. The difference in frequency of the emissions from the intruder aircraft as received by the protected aircraft from the standard frequency as a result of the Doppler effect will be a direct measure of the closing rate or the range rate. Since both range and range rate are then known, the value of $\tau$ may be determined. The altitude of the intruder aircraft is broadcast as a part of its transmitted signal. From these data, all of the information necessary to evaluate the collision threat from the intruder aircraft in accordance with the $\tau$ system may be determined in the protected aircraft.

In the foregoing discussion and in that which follows, the invention is described in terms of an intruder and a protected aircraft; it will be apparent however, that the roles of the aircraft can be interchanged. In fact, it is contemplated that both aircraft will carry identical equipment so that each will be apprised of the collision threat from the other. To this end, each aircraft is assigned a predetermined time slot in a given period such as each second for broadcasting its own warning pulse. The preassigned time slot identifies the intruder, so that the protected aircraft, upon receiving the intruder's transmission, not only has information of a potential threat, but also can identify the intruder according to the time slot in which the pulse is received. After a warning pulse has been broadcast by each of the aircraft equipped with the apparatus according to the invention, the process is repeated in a cyclic manner. The minimum duration of a cycle of pulses will of course depend upon the number of aircraft included in the system. An illustrative slot width might be five milliseconds in which case a cycle one second long accommodates 200 aircraft.

THE TAU SYSTEM

As noted above, the criteria used to determine whether a threat of collision exists in the $\tau$ system are the minimum altitude difference of the intruder, minimum range and minimum $\tau$. The significance of the $\tau$ criteria can be explained by reference to FIG. 2 which is a vector diagram of the "collision triangle." For purposes of the following discussion it is assumed that the altitude difference between the protected and intruder aircraft is not sufficiently great to preclude the possibility of collision. Accordingly, the threat of collision with respect to the intruder is to be evaluated.

In FIG. 2, the point P represents the position of the protected aircraft and the vector $V_p$ represents its velocity and direction. Similarly the point I represents the intruder and vector $V_I$ the intruder's course and speed. The range between the two is represented by the line $r$. The relative velocity and its heading can be obtained by reversing the vector $V_I$ and positioning it at the end of the vector $V_p$ as shown. The relative velocity of the protected to the intruder aircraft is then the vector $V$. If this vector $V$ is extended, the point of closest approach of the extension to the point $I$ is the point $X$ where a line perpendicular to the extension of vector $V$ intersects $I$. The distance between $X$ and $I$ is $C$, the distance between the two aircraft at the instant of closest approach. The distance between $P$ and $X$ is equal to $Vt$, where $t$ is the time to the instant of closest approach. The "collision triangle" is the right triangle formed by the three sides $r$, $C$ and $Vt$. The position of the two aircraft at the time of closest approach will be $P'$ and $I'$ respectively, the distance $I$ to $I'$ being $V_I t$, and $P$ to $P'$ being $V_p t$. The angle between the heading of the protected aircraft and the intruder, $\phi$ is the bearing angle and $\theta$ is the angle between the relative velocity vector and the line of sight to the intruder.

From the collision triangle, certain relationships may be developed. Thus:

$$r^2 = V^2 t^2 + C^2$$

or $$r = Vt\sqrt{1 + \frac{C^2}{V^2 t^2}}$$

If the first equation is differentiated with respect to time to determine range rate, $$r\frac{dr}{dt} = V^2 t$$

or $$\frac{dr}{dt} = \dot{r} = \frac{V^2 t}{r} = \frac{V^2 t}{\sqrt{V^2 t^2 + C^2}} = \frac{V}{\sqrt{1 + \frac{C^2}{V^2 t^2}}}$$

The quanity $\tau$, which is defined as $$\frac{r}{\dot{r}}$$

is then:

$$\tau = \frac{Vt\sqrt{1 + \frac{C^2}{V^2 t^2}}}{\frac{V}{\sqrt{1 + \frac{C^2}{V^2 t^2}}}} =$$

$$\tau = t\left(1 + \frac{C^2}{V^2 t^2}\right)$$

It will be observed in FIG. 2 that the tangent of the angle $\theta$ is $$\frac{C}{Vt}$$

Therefore $\tau = t(1 + \tan^2 \theta)$.

Thus, if $\theta$ is 0, i.e. the relative velocity vector coincides with the line of sight $\tau$ is equal to $t$, and since the value of $C$ is then 0, a collision will occur unless an appropriate escape maneuver is undertaken. To warn of this situation, as well as others, the fact that $\tau$ has its minimum value before the aircraft reaches the point of closest approach if $C$ is *not* zero is used. This can be explained as follows. $\tau$ is first measured at a fairly long range. For long ranges, $\theta$ is small and its tangent is small. Therefore, $\tau$ is approximately equal to $t$. As the range to the intruder diminishes, $\tau$ diminishes as does $t$. However $\tau$ does not diminish as rapidly as $t$ since $\theta$ begins to increase at short ranges; when $\theta$ is large, $\tau$ is also very large. Thus as the range between protected and intruder aircraft diminishes, $\tau$ will go through a minimum value and then increase if $C$ is not equal to 0. The time when this will occur can be determined by differentiating the $\tau$ equation with respect to time, $$\frac{d\tau}{dt} = \dot{\tau} = 1 - \frac{C^2}{V^2 t^2}$$

and setting this equal to 0:

$$1 - \frac{C^2}{V^2 t^2} = 0$$

or $$C^2 = V^2 t^2$$

or $$C = Vt$$

It will be observed that for the minimum value of $\tau$ the value of $\theta$ is 45° and $\tan \theta = 1$. Thus, at this minimum value $\tau = 2t$ and the actual time to collision is $C/V$ rather than $2C/V$ as given by the $\tau$ equation. The distance between aircraft at this minimum value of $\tau$ is $\sqrt{2} C$. From the foregoing it will be apparent that the larger the value of the minimum distance $C$, the greater will be the range at which $\tau$ will pass through its minimum value.

In practice then, the value of $\tau$ is computed from measured range and range rate as the aircraft close. If $\tau$ passes through a minimum value and begins to increase before the time when operational requirements dictate an evasive maneuver must be taken, then the two aircraft will not collide. If $\tau$ does not reach a minimum by this time, then there is a possibility that $C$ is 0, or that it is extremely small and the protected aircraft takes action to avoid the collision. In practice it has been found that it takes about 30 seconds for an aircraft to maneuver effectively to avoid a collision. If a minimum escape time of $t = 30$ seconds is required, then the $\tau$ criterion might be set so that $\tau$ minimum = 60 seconds. Then the real escape time $t$ varies between 30 seconds (if the minimum occurs at $t = 60$ seconds) and 60 seconds (if the minimum would ocur near the collision time).

It will be observed that the value of $\tau$ is computed by taking the ratio of range to range rate. In systems heretofore proposed for implementing the $\tau$ system, the equivalent of range only was measured. Range rate was determined by measuring the range at different time intervals and computing the rate from the measured range difference and time interval. In practice, this resulted in a substantial delay between the measurement and the actual time when the $\tau$ value was available. This time had to be added to the actual minimum time to maneuver, with the result that in these prior systems, because of delay in measurement and computation, aircraft would be taking evasive maneuvers which in fact were not required. In the system of this invention, data as to both range and range rate are available simultaneously from each measurement and accordingly $\tau$ minimum may be set almost exactly at the minimum value dictated by operational requirements. Thus the number of unnecessary evasive maneuvers is reduced.

For low values of relative velocity, as when the two aircraft are on almost parallel courses, it is possible that neither the time of closest approach nor $\tau$ will have reached the point where an alarm is sounded, even though the aircraft are closer than is operationally desirable. To avoid this possibility, a minimum range is also specified. If the range between the two aircraft drops below this value, the protected aircraft should take evasive action, regardless of the $\tau$ indication.

GENERAL DESCRIPTION OF SYSTEM

In describing the functional block diagram of the airborne portion of a system made according to our invention as shown in FIG. 3 and the ground based portion illustrated in FIG. 4, certain assumptions as to the system operation will be made. These include the fact that the system is a time-shared one with each aircraft in the system being assigned a 5 millisecond "slot" out of a total 1 second period. Further, each aircraft in the system is to transmit a coded waveform once each second. Further, as will be explained in greater detail below, all aircraft in the system are under the control of a ground station which is equipped with a precise stable frequency standard. The frequency standards in the aircraft are controlled by the ground standard; the ground station transmitting to all aircraft in the system every 10 seconds for one second for synchronization. During this one second period no transmissions take place from any aircraft in the system other than those made in response to ground interrogations.

While the above assumptions are made for the purpose of explanation of a practical operative system, it will be apparent to those skilled in the art that the choice of times for slot width, repetition frequency pulse coding and the like are not critical and that widely different choices are available to the designer depending upon the particular practical problem in collision avoidance which he is attempting to solve.

Further it will be obvious from the description that the system need not be restricted to pulse modulation; time modulation techniques that present no ambiguities or mutual interference might also be employed.

FIG. 3 is a functional block and line diagram of the airborne portion of a collision avoidance system embodying our invention. As there indicated, the system includes a receiver 30, which is of conventional design, and preferably of the super-heterodyne type, a transmitter 32 and a local frequency standard 34. The transmitter is connected to a transmitting antenna 36 and the receiver to a receiving antenna 38. A single antenna with duplexing may be used if desired.

To insure that all aircraft using the system operate at the same frequency, the transmitter 32 is controlled in frequency by the aircraft frequency standard 34. A modulator 40 of conventional design supplies the transmitter with signals appropriate to amplitude modulate the transmitter output signal at the proper times with the proper information.

The modulator 40 is supplied the signals for transmission from the summing junction 42 to which are supplied signals from the altitude and range signal generators 44 and 46 respectively. These are summed at summing junction 48 and the composite waveform is summed with the output signal from the beacon response circuit 49 whose function will be described in greater detail below. This combined signal is supplied to the modulator 40. The function of gate 73 will be explained below.

Before discussing the actual signals generated by the altitude signal generator 44 and the range signal generator 46, reference will be made to FIG. 5a which illustrates a typical waveform which is transmitted by an aircraft during the 5 milliseconds in each second which is assigned to it. As shown in FIG. 5a, for approximately the first millisecond no transmission is made. Thereafter, for the remaining 4 milliseconds a pedestal is transmitted and superimposed on this pedestal are a number of signals. The principal function of the pedestal is to provide a signal from which information as to the range rate between the transmitting and receiving aircraft may be determined. Superimposed on the pedestal during approximately the second millisecond of the 5 millisecond slot are 5 pulses which comprise the "altitude code." As will be explained below in greater detail, a number of different types of signal are received consecutively by the receivers of the protected aircraft and by the ground station. To identify the altitude pulse which appears immediately following the altitude code, a series of 5 pulses are provided immediately preceding it in time. These indicate to appropriate circuits in the receiver that the next long pulse following the five pulses will be the altitude pulse whose length is indicative of the altitude of the transmitting aircraft.

Following the altitude pulse in the transmitted waveform there is a period when only the pedestal is transmitted. If desired, other data may be inserted on the pedestal at this point such as pulse codes indicative of expected or preferred maneuver. Finally, at the end of the slot a rather sharp pulse of relatively great amplitude is transmitted. This pulse, called the range pulse, indicates that the 5 millisecond transmitting time is ended. The range pulse is received by each of the other aircraft in the system delayed by the time of propagation. This delay is measured in each of these other aircraft to obtain the range between it and the transmitting aircraft.

Referring again to FIG. 3, an aircraft altimeter 50 supplies a signal to the altitude signal generator 44. The altitude signal generator generates the waveform comprising the 5 pulses of the altitude code and the altitude pulse whose length is proportional to the transmitting aircraft's altitude; it supplies this wave form on lead 52 to the summing junction 48.

The range signal generator supplies the four millisecond range rate pedestal and the pulse at the end of the appropriate 5 millisecond slot on lead 54 to the summing junction 48. The sum of the signals on leads 52 and 54 then is the composite modulation waveform shown in FIG. 5a. Both the altitude and the range signal generator are supplied from a 200 pulse per second source which, as will be hereinafter explained, is synchronized with the corresponding pulse trains in all other aircraft in the system and with the ground station. The digital dividers 56 supply the 200 pulses per second to the system; additionally, it supplies a 5,000 pulse per second pulse train to the altitude signal generator on lead 58 for the purpose of generating the altitude code. The digital divider 56 in turn is supplied with clock pulses by pulse generator 60 whose frequency in turn depends upon that of the frequency standard 34. Additionally, as shown, the beacon signal from the beacon response circuit 49 is also supplied to the summing junction 42 to assist in both initiating and maintaining synchronization of the aircraft timing signals.

The reader should here refer to FIG. 5 and in particular to FIG. 5b, which represents the ground transmissions to all aircraft in the system. A coded pulse is transmitted every 10 seconds to indicate the beginning of each one second synchronizing period. Additionally, the ground station transmits a train of 200 pulse groups per second during the synchronizing following the 10 second synchronizing signal. The ground station ceases transmission after the one second period and begins again after the next 10 second pulse indicates the beginning of the next period.

Each pulse group in the 200 pulse groups following the 10 second pulse group consists of two groups, an interrogation group that is periodic at the 200 p.g.p.s. rate and a synchronization group that has a position dependent on the range of the particular aircraft being interrogated.

The pulses forming the 200 pulse groups are not single pulses but, for example, are a group of three short sharp pulses to enable the aircraft to recognize this pulse train as the 200 pulse group per second master pulse train and differentiate it from the altitude, range, 10 second and other pulses. The 10 second pulse might consist, for example, of a series of 8 closely spaced individual pulses. For the remainder of the discussion herein it is assumed that these pulses have this form although it is to be recognized that other pulse codes could be used.

The 200 pulse group per second pulse train from the ground is the master pulse train to which the pulse trains in all the aircraft are synchronized. Synchronization is accomplished initially upon the reception of the first 10 second pulse and thereafter is corrected upon the reception of each additional 10 second pulse.

As shown in FIG. 3, the intermediate frequency signal from the receiver is connected to two different detectors, an amplitude detector 62 and a frequency modulation detector 64. The signal from the frequency modulation detector is fed directly to the range rate measuring circuit 66 while the signal from the amplitude modulation detector is connected as shown to the synchronizing and decoding circuits 68, the altitude difference measuring circuit 70 and the range measuring circuit 72.

The synchronizing and decoding circuits 68 recognize the various pulse groups as they are received and initiate actions in the airborne equipment corresponding to the time of reception of the various groups. Thus, the sequence begins when the first 10 second pulse group is received; the pulse sequence of 8 closely spaced pulses is demodulated by the amplitude modulation detector and the synchronizing and decoding circuits recognize this as a 10 second pulse. These circuits 68 supply a signal to normally open gate 73 to close it so that no altitude or range transmissions can take place during the synchronizing period. The system then begins to count from this pulse to the time of its appropriate slot assignment using pulses of the 200 pulse group per second pulse train received from the ground. When the internal counter in the airborne equipment indicates that it has reached its slot assignment, the next pulse group of the 200 p.g.p.s. train received from the ground is passed to the synchronizing and decoding circuits to the beacon response generator 49 which retransmits a pulse signal. The retransmitted pulse is received by the ground equipment in the aircraft time slot within the aircraft's 5 millisecond time slot. Since the ground equipment can take into account the known delay in reception and retransmission by the airborne equipment, it has a measure of the round trip delay between the ground and the aircraft; it therefore can transmit a second or synchronizing pulse group in the same 5 millisecond interval so that it will arrive at the aircraft exactly at a predetermined time, for example, 4 milliseconds after the transmission of the interrogation group. This synchronizing pulse group is decoded and applied to the frequency and phase correction circuit 74, which then corrects the frequency standard and the clock pulse generator to bring them into time synchronism with the master 200 p.g.p.s. pulse train as transmitted by the ground. Every 10 seconds thereafter a similar frequency and phase correction is completed so that all aircraft utilizing the same ground station are synchronized once every 10 seconds.

The synchronizing and decoding circuit 68 also provides a signal on lead 76, to the altitude difference measuring circuit 70, the range measuring circuit 72 and the range rate circuit 66 for purposes of activating these circuits when an altitude code pulse is received. These altitude, range and range rate circuits are gated at the appropriate time to measure the incoming signals supplied from the amplitude modulation detector. As shown, the range measuring circuit is also supplied with pulses from the 200 pulse per second bus and the difference in time of arrival of a range pulse and one of the pulses of the synchronized 200 pulse per second train is a measure of the range of the aircraft which transmitted the received range pulse during that slot period. The output of the range measuring circuit 72 and the range rate measuring circuit 66 are both supplied to a computation circuit 77 which generates an alarm dependent both upon the $\tau$ criteria previously discussed and on minimum range. This is supplied to the indicator 78 which provides a visual indication to the aircraft pilot of the danger. It may also be supplied to the auto pilot if necessary. The altitude difference is measured by the altitude circuit which, as can be seen, is supplied with a signal representative of the altitude of the aircraft carrying the receiver on lead 80. The measured altitude difference signal is also fed to the computation circuit 77 and as will be explained is used in determining the threat of collision from surrounding aircraft.

FIG. 4 is a block diagram of typical ground station equipment which might be used in conjunction with the airborne equipment such as is illustrated in FIG. 3 for time synchronization of the aircraft system with a ground time standard. As shown in FIG. 4, a very accurate frequency standard 100, which might be, for example, an atomic beam frequency standard is provided. The signal from the frequency standard is supplied to a frequency synthesizer and pulse generator 102. This circuit is of conventional design and supplies the various pulse trains and signals at the desired frequencies from the signal supplied by the primary frequency standard 100.

It is obvious, from the foregoing that a ground station will be provided in each area or locality where the concentration of air traffic is great enough to make some system of collision avoidance a necessity, e.g. in the vicinity of major cities having heavy commercial air traffic. It is contemplated that means will be provided for synchronizing the frequency standards at each of these ground locations just as all aircraft are time-synchronized to a single ground station.

More particularly, the frequency synthesizer supplies signals which control the carrier frequency of the ground station transmitter 104 via lead 106 and the local oscillator frequency of the receiver 108 via lead 110. The frequency of these signals is of course dependent upon the frequency assigned for operation of the system.

The frequency synthesizer also supplies, via lead 112, the pulse sequence appearing once every 10 seconds, which is used to periodically resynchronize the airborne systems under control of the particular ground station. These, and other signals which are to be transmitted, are supplied to the modulator 113 which suitably modulates the signal from transmitter 104.

The frequency synthesizer 102 also supplies a pair of pulse trains on leads 114 and 116 to gate circuits 118 and 120 respectively. For reasons to be explained hereinafter, these pulse trains are at a relatively high frequency, i.e. 10 megacycles and 20 megacycles, and the pulse train fed to gate 120 is at twice the frequency of that supplied to gate 118. The output of both gate circuits is connected via a summing circuit 122 to a counter 124. When the counter reaches its full count, it generates a synchronizing pulse group for the aircraft.

Gates 118 and 120 are each controlled by a flip-flop circuit, gate 118 by flip-flop 126 and gate 120 by flip-flop 128. Flip-flop 126 is operated to open gate 118 by the pulses in the master pulse train on lead 130, and is operated to close gate 118 by the reception of the beacon response signal from the aircraft, the reception of which is recognized by the decoder 132 supplied by the output signal from receiver 108. The flip-flop 128 is operated to open gate 120 by the pulses of a pulse train which is identical in frequency but which is delayed for example by exactly 3 milliseconds with respect to the master pulse train appearing on lead 130. Gate 120 is closed when flip-flop 128 is operated by the synchronizing pulse generated by counter 124 when it reaches its full count.

It is believed that, except for the synchronizing circuits, the operation of the circuit of FIG. 4 will be apparent from the foregoing description. The synchronizing circuits operate in the following manner. A maximum range to which the system is to respond is selected. If, for example, the ground station is to synchronize all aircraft within an approximately nautical 160 mile radius of it, then the maximum time required for a one way trip between ground station and aircraft will be one millisecond and the maximum round trip time will be two milliseconds.

Counter 124 is supplied with pulses from the 10 megacycle pulse train during the time of the round trip between ground station and aircraft. The counter is so constructed that for an aircraft at maximum range the counter will be filled in this interval by pulses at the 10 megacycle rate. For the 160 nautical mile radius previously mentioned, the maximum round trip time would be 2 milliseconds so counter 124 would have a capacity of 20,000. If each aircraft in the system is to receive its synchronizing pulse 4 milliseconds after its time slot begins, then the synchronizing pulse for an aircraft at the maximum range must be transmitted 1 millisecond earlier, or 3 milliseconds after the time slot begins. Thus the pulse train supplied to flip-flop 128 is delayed 3 milliseconds with respect to the master pulse train.

The system then operates as follows. Pulses are supplied to counter 124 through gate 118 at a 10 megacycle rate. If the round trip time to the particular aircraft is less than 2 milliseconds counter 124 will not reach capacity, the difference between the count reached and counter capacity representing the difference between the actual round trip time and the maximum time. Thereafter, 3 milliseconds after the time slot began, flip-flop 128 is operated, gate 120 is opened and pulses at a 20 megacycle rate are supplied to counter 124. These pulses bring the count in the counter to capacity in ½ the time that the 10 megacycle pulse train would have required and when the counter reaches full count, a synchronizing pulse is transmitted which will arrive at the aircraft exactly four milliseconds after the time slot began, regardless of the aircraft range.

An example of the operation of the synchronizing circuit is as follows. Assume an aircraft is at a range of approximately 80 miles from the ground station at the time it generates a beacon response so that the round trip time is 1 millisecond. At the time the ground pulse which generated the beacon response was transmitted, gate 118 was opened and 10 megacycle pulses were supplied to counter 124. The beacon response from the aircraft received 1 millisecond later, after decoding, closes gate 118 by operation of flip-flop 126. The count in counter 124 is now 10,000.

No pulses are fed to the counter from the time of the beacon response (1 millisecond) until the time the delayed pulse operates flip-flop 128 and opens gate 120. Pulses are then fed to counter 124 at a 20 megacycle rate until the counter 124 reaches a 20,000 count. This will occur precisely ½ millisecond after gate 120 is opened (3 milliseconds after the original transmission) and 1½ milliseconds before the next "range pulse" in the master pulse train. The synchronizing pulse generated by counter 124 is supplied via lead 134 to the modulator 113 and also to flip-flop 128 to close gate 120.

Thus the transmitted counter pulse has been advanced with respect to the master synchronizing pulse train an amount exactly equal to one half the total round trip delay between ground station and aircraft; it will arrive at the aircraft exactly in synchronism with the time the local synchronized pulse should occur. The accuracy of the advance is of course dependent upon the period of the pulse trains appearing on leads 114 and 116. Using pulse trains of the frequencies indicated, synchronization within 1/20th of a microsecond will be achieved.

It is also emphasized that the drawing of FIG. 4 does not represent a complete ground station, but only that portion of it which is necessary for synchronization of the aircraft and ground pulse trains.

SPECIFIC DESCRIPTION

*Decoding and synchronizing circuits*

The detailed circuitry of the decoding circuits is illustrated in FIG. 6. As shown, the signal from the receiver amplitude detector is supplied to a shift register 200 having eight stages. The register is of conventional design. As each pulse is received by the register, the signal (either a pulse or no pulse) in the previous stage is stepped to the next stage by the shift pulse supplied on lead 250, the source of which will be described below. Thus, if a sequence of three pulses are transmitted, leads 202, 204 and 206 will indicate the presence of a pulse. If five pulses are transmitted in sequence, as with the altitude signal, then leads 208 and 210 will also be energized. If 8 pulses are transmitted in sequence, as with the 10 second pulses, leads 212, 214 and 216 as well as all the other leads will be energized.

Thus, three "and" gates are connected to the register. One, the ten second "and" gate 218 is connected to all of the register output leads and produces an output pulse only when all of the register output leads are energized. A second "and" gate is provided to recognize the altitude pulses; it is connected to the first five of the register output leads, i.e. leads 202, 204, 206, 208 and 210. When these five leads are energized, the altitude "and" gate 220 produces an output pulse. In similar fashion the five millisecond "and" gate 222 recognizes the energization of the first three leads of the register.

The shift pulses for the register 200 which appear on lead 250 are generated as follows. Each pulse detected by the amplitude detector is passed directly to an "or" circuit 252 via lead 254. The pulse is also delayed one pulse period by delay circuit 256 and passed to the "or" circuit 252 via lead 258. Thus each input pulse generates two shift pulses, one on lead 254 and one on lead 258, the one on lead 258 appearing one pulse period later in time. The input pulses are also delayed one half a pulse period by delay circuit 260 to permit the shift pulse to shift the register before the received pulse is passed for storage therein.

The register then operates as follows. Assume a group of three pulses is received, being one group of the 200 pulse groups per second master pulse train. The first pulse shifts the register so that the first stage has no pulse stored therein, and one half pulse period later the first of the three pulses is stored in the first stage of the register. The shift pulse appearing on lead 258 corresponding to the delayed first pulse is supplied to the register at exactly the time of arrival of the second pulse of the group, and this second pulse also shifts the register and is stored in the same fashion. Similarly the third pulse shifts the register and is stored. However, after the reception of the third pulse, no further pulses are received for a time longer than one pulse period. The delayed pulse appearing on lead 258 after the reception of the third pulse shifts the register, taking the pulses stored in the first three stages and moving them along one stage. Thus the leads 202, 204 and 206 will be energized and "and" circuit 222 will provide an output signal only for the time of one half pulse period between the time that the third pulse is passed by the delay circuit 260 and the time that the delayed shift pulse due to the third pulse shifts the information in the shift register.

Exactly the same sequence will take place for the reception of five pulses in a group or eight pulses, so long as the spacing between pulse groups is longer than one pulse period.

Because "holes" are provided between each group of received pulses, only the "and" circuit appropriate to that group of pulses will generate an output signal upon reception of the group.

The output pulse of the 10 second "and" gate 218 is connected to the flip-flop 226 which controls the gate 228. Gate 228 is initially closed, but is opened upon reception of a 10 second pulse group which operates flip-flop 226. Thereafter pulses from the 5 millisecond "and" gate are passed by the gate 228 to the preset counter 230. The preset counter is manually set to a particular number between 1 and 200 which is the slot assigned for the aircraft as indicated by the control labeled "Z." Pulses supplied to the preset counter cause the count stored therein to increase until the total count—200—is reached at which time a pulse will be generated. The output pulse from the preset counter 230 is used to operate a 5 millisecond delay multivibrator 232 which in turn operates the gate 234. The gate 234 transmits any pulses received during the period it is open, these pulses being delayed by the fixed delay indicated at 236. The flip-flop 226 also controls the gate 73 by the signal on lead 227. When flip-flop 226 opens gate 228, it closes gate 73 to prevent aircraft signal transmission during the synchronization period.

In describing the operation of the circuit of FIG. 6, it will be assumed that the manual slot assignment has been set into the preset counter, but that the system has not heretofore been operative. It will also be assumed, of course, the register 200 has no data stored in it. As will be apparent from the explanation below, under these conditions there are no pulses being transmitted to the various parts of the aircraft circuit and accordingly no signals are being generated or transmitted. The gates 228 and 234 are closed. Even though the altitude "and" circuit 220 may be periodically energized, the absence of signals to the range and altitude circuits, respectively, render them inactive.

Under these conditions, when the first ten second pulse appears, it will be recognized by the 10 second "and" gate 218 and the pulse generated thereby will operate the flip-flop 226 and the operation of the flip-flop will cause gate 228 to open. Thus, the preset counter will be ready to begin to count with the appearance of the 10 second pulse. Although the 5 millisecond "and" circuit 222 will also generate a pulse on the first three received pulses of the 10 second pulse sequence by the time that the flip-flop 226 has opened gate 228, this pulse will have disappeared. Accordingly, this pulse will not be counted; the 5 millisecond pulse corresponding to the second pulse of the master pulse train will however be passed to the preset counter 230. When sufficient pulses have been received by the preset counter so that the total is 200, this counter will generate a signal which will operate the 5 millisecond delay multivibrator 232 and open gate 234. The pulse from the preset counter 230 will also reset flip-flop 226 which in turn will cause gate 228 to close and open gate 73 so that transmission can begin.

The next pulses received by the aircraft will be passed through the gate 234 and used to start the internal timing circuits and generate the beacon response as will be explained more fully below.

As noted above, the altitude "and" gate 220 produces an output pulse wherever five closely spaced consecutive pulses are received indicating that an altitude signal will follow. The output pulse from the altitude "and" operates a flip-flop 240 which in turn controls the input gate circuits to the range, range rate and altitude measuring circuits. The output signal from the flip-flop 240 is supplied to these circuits via lead 242. The flip-flop 240 is "reset" to its "zero" state during each five millisecond time slot by a signal derived from the range measuring circuit, as will be described below in greater detail.

FIG. 7 shows internal timing and beacon circuits which might be used in conjunction with the airborne equipment of FIG. 3 and the decoder of FIG. 6.

The beacon circuit is quite simple. As shown, it includes a gate 300 which is controlled by a flip-flop 302. The flip-flop is set by the 10 second signal from the ground station appearing on lead 238 so that beacon gate 300 is open and sequence gate I, gate 304 is closed. The pulse group of the 200 pulse groups per second pulse train received following the time that preset counter 230 reaches the count corresponding to the slot assignment, is passed through gate 234 and through gate 300 as the beacon response signal. Upon reception by the ground station of the beacon response, a synchronizing pulse group appropriately advanced in time is transmitted as has been explained above.

However, by the time that the synchronizing pulse group is received, flip-flop 302 has changed state, since the interrogation pulse was also applied to this flip-flop, although delayed by delay circuit 307. Thus the synchronizing pulse group transmitted from the ground is not passed through the beacon gate but is supplied to sequence gate 304 to start the aircraft timing operations.

The basic timing generator in the aircraft is a 10 megacycle per second oscillator 306, whose output signal supplies a frequency synthesizer 308 and a pair of pulse generators 310 and 312. For reasons which will be explained below, the oscillator output is changed in phase by 180°, as indicated at 314 before being supplied to pulse generator 310.

The frequency synthesizer generates signals of appropriate frequency for the transmitter and receiver from the signal of oscillator 306. Pulse generator 312 generates a 10 megacycle per second pulse train which is supplied through various control circuits to be explained below to the digital divider circuits 316. The digital divider circuits provide pulse trains at 5000 pulses per second, as on lead 318 and 200 pulses per second as on lead 320. It is these latter pulse trains which are exactly synchronized with the ground station master pulse train of corresponding frequency.

The first synchronizing pulse supplied through sequence gate 304, is slightly delayed by delay circuit 322 and operates the flip-flop 324. As indicated by the control labelled "X," this flip-flop is manually reset so that the gates under its control, gates 326 and 328 are closed at the time operation begins. The manual reset control, "X," also sets the digital dividers to zero when operated. The synchronizing pulse group operates the flip-flop 324 and opens both gates. These gates then remain open so long as the system continues operation. However, because of the delay in operating flip-flop 324, the first synchronizing pulse group is not passed by gate 326.

Pulses from the pulse generator 312 are supplied to the digital divider 316 which begins supplying the pulse trains it generates to the remainder of the airborne equipment when gate 328 is opened.

The equipment continues to operate in this fashion until the next 10 second pulse is received. On the second 10 second pulse, the decoding circuit of FIG. 6 operates in the same fashion as has been described, a second beacon response is transmitted to the ground and a second synchronizing pulse is received. This second synchronizing pulse however does not operate flip-flop 324 to open gates 326 and 328 since the flip-flop is already operated. Rather, this pulse is passed through gate 326 to operate flip-flop 330 and cause it to change state.

As seen in FIG. 7, flip-flop 330 is also supplied with a pulse train from the digital divider on lead 332. One pulse every 10 seconds is supplied both to flip-flop 330 and flip-flop 334 from the digital divider. This pulse occurs in the assigned time slot of the aircraft and occurs in the instant the synchronizing pulse group arrives if the clock of the aircraft is perfectly synchronized with the ground station. Following the example given above, it would occur 4 milliseconds after one of the pulses in the pulse train appearing on lead 320.

The ten second reset pulse, received and detected from the ground station resets flip-flops 330 and 334 for example to their "zero" states. If the detected subsequent synchronizing pulse and the ten second or subsequent pulses of the airborne equipment arrive at flip-flop 330 at different times, one will cause it to change to the "one" state and the other to the "zero" state. Thus flip-flop 330 will be in the "one" state for a time equal to the difference in time between the time of arrival of the synchronizing pulse and the ten second pulse of the airborne equipment. When flip-flop 330 is in the "one" state it opens gate 336 passing the output of flip-flop 334 to the error correcting circuits. Since both flip-flop 330 and 334 are set to the "zero" state by the 10 second reset pulse from the ground but flip-flop 334 changes to the "one" state only upon reception of the 10 second airborne digital divider pulse, the state of flip-flop 334 during the period that gate 336 is open will indicate whether the synchronizing pulse is received earlier or later in time than the aircraft ten second pulse. If the synchronizing pulse is earlier than the ten second pulse, then flip-flop 334 will not yet have changed state from "zero" to "one." If, on the other hand, the synchronizing pulse is later than the aircraft ten second pulse, the flip-flop 334 will be in the "one" state when the gate 336 is open. (It is assumed in the following discussion that the flip-flop 334 supplies a positive signal in the "zero" state and a negative signal in the "one" state.)

If the synchronizing pulse is later than the ten second aircraft pulse, it indicates that the oscillator 306 is slightly above the correct frequency and the aircraft timing signals are slightly fast. The gated output from the gate 336 will be a negative voltage of duration equal to the timing error. This negative voltage is applied directly to the trigger circuit 338 which closes normally open gate 340. Since all pulses to the digital dividers pass through gate 340, the closing of this gate deletes from the pulse train to the divider just the right number of pulses to bring the aircraft and ground timing systems into synchronism.

If, on the other hand, the synchronizing pulse is early, the output of gate 336 will be positive during the time it is open. An early synchronizing pulse indicates oscillator 306 is low in frequency compared to the ground standard and that extra pulses must be supplied to the digital dividers to bring both aircraft and ground systems into time synchronism.

This is accomplished in the following manner. The pulses generated by pulse generator 310, while of the same frequency as those supplied by generator 312 are delayed by 0.05 microsecond (½ a period) because of the 180° phase change. These pulses are supplied to normally closed gate 342. If the output of gate 336 is positive, it operates trigger circuit 345, opening gate 342 and thus supplying the additional pulses via "or" circuit 344 to the digital dividers. The gate 342 is open for the interval that gate 336 is open. Thus the pulses supplied are just the right number to bring the ground and airborne pulse trains into synchronism.

To bring the oscillator 306 to a frequency corresponding to the frequency of the standard in the ground station, the pulses, either positive or negative, from the gate 336 are integrated as by integrator 346 and the integrated signal applied to correct the oscillator frequency through oscillator frequency control circuit 348. Thus, not only are the aircraft and ground pulse trains brought into synchronism once every 10 seconds, but also the aircraft oscillator is gradually adjusted in frequency in accordance with the required changes so that the required 10 second corrections are minimized as time progresses.

In this manner, the only requirement for a highly stable frequency standard is in the ground station, the aircraft standards being periodically adjusted and gradually corrected so that their frequency corresponds to that of the ground standard.

Each time that its particular five millisecond time slot is reached in each second, an aircraft using our invention must transmit a signal by which other aircraft in the system can determine its range, range rate and altitude. This signal has been described above and is illustrated in FIG. 5a. This section will describe apparatus for generating the required signal to modulate the aircraft's transmitter.

FIG. 8 illustrates apparatus generally illustrated at 46 in FIG. 3, for generating the signal from which other aircraft in the system can determine the range and range rate of the transmitting aircraft. As shown therein, a preset pulse counter 400 is provided which is manually preset to the desired slot assignment, as indicated by the input thereto labeled "Z." The counter is constructed so that if the $n^{th}$ slot is assigned to the aircraft, the counter will provide an output pulse when $n-1$ pulses have been supplied thereto. The aircraft 200 pulse per second pulse train appearing on lead 320 (FIG. 7) is supplied as an input to the counter 400. Since in the assumed example only 200 aircraft are to be accommodated in the system, the counter 400 will provide 1 output pulse for each 200 input pulses at the beginning of the assigned 5 millisecond time slot. The counter 400 is automatically reset once every 10 seconds by the output signal from preset counter 230 appearing on lead 402 and of course, it may be manually reset at any time.

The pulse output from counter 400 is supplied via lead 401 to a delay multivibrator 404 and multivibrator 405. The signal appearing on lead 401 is also used to reset the altitude generator flip-flops, as will be hereinafter explained. The output signal of the multivibrator 405 remains fixed for approximately 1 millisecond after it receives the signal from preset counter 400. It then changes state for approximately four milliseconds and then reverts to its original state. This waveform is sketched in FIG. 8 beside lead 405 on which it appears.

This waveform is transmitted to a summing circuit 408 whose output lead 54 (as shown in FIG. 3) carries the range modulation signal. The sharp spike at the end of this waveform is generated in the following manner. A normally closed gate 412 is provided which is controlled by the output signal from multivibrator 405. When the multivibrator 405 is operated, gate 412 is opened. Pulses from the 200 p.p.s. synchronized source are supplied to gate 412. Because the total delay of the delay multivibrator 404 and multivibrator 405 is 5 milliseconds and the pulses supplied to gate 412 have a 5 millisecond period, the gate 412 will be closed just as a pulse appears at the gate input. Thus only the rising leading edge of the pulse will be passed by the gate 412 to the differentiator circuit 414, which will further sharpen the pulse. The pulse is amplified by a pulse amplifier 416 and supplied to the summing circuit 408 where it is summed with the "pedestal" generated by multivibrator 405, the two portions combining to form the range modulation signal.

Apparatus for generating the altitude signal, generally illustrated at 44 in FIG. 3, is specifically illustrated in FIG. 9. As shown therein, a flip-flop 500 is provided having a pair of inputs. One input is connected, via lead 401 to the output terminal of the preset counter 400 in the range circuit of FIG. 8. The output pulse from the pre-set counter sets flip-flop 500 to the "zero" condition if it is not already in this condition at the start of the aircraft time slot. The flip-flop is set to the "one" condition, opening gate 502 when the multivibrator 405 in the range circuit of FIG. 8 changes state. Gate 502 is supplied with a synchronized pulse train from the digital divider 316 shown in FIG. 7, the pulse train there appearing on lead 318. The pulses passed by gate 502 are supplied to the summing junction 504, and to the altitude code counter 506. This counter counts until the appropriate number of pulses have been passed which will enable the decoders of other aircraft to recognize the altitude signal. In the system described, 5 pulses are used for this purpose. Accordingly, when 5 of the 5,000 pulses per second have been supplied to the counter it generates a pulse which returns flip-flop 500 to the "zero" state, closing gate 502. As noted, these pulses constitute the altitude signal recognition code.

The pulse output from the counter 506 is also supplied to the differentiator 508 which sharpens it and supplies it to the two flip-flops 510 and 512. Both of these flip-flops are reset to "zero" at the beginning of the time slot by the pulse from the preset counter appearing on lead 401. The output from flip-flop 512, when in the "one" state is integrated by integrator 514 to generate a linearly rising voltage. The integrator is clamped initially at a zero value by clamp 516, which in turn is controlled by a delay multivibrator 518.

The rising voltage from integrator 514 is supplied to a difference amplifier 520 as one of its two input signals. The other input signal is an analog voltage corresponding in amplitude to the aircraft altimeter reading. This is supplied by the analog read out circuit 522 via lead 523 and is used both in the altitude signal generating circuit and in the altitude receiver.

When the signal from the integrator exceeds in magnitude the analog input signal, the difference amplifier output changes polarity; this change in polarity operates trigger 524 which generates a pulse. This pulse is differentiated, as by differentiator 526, and supplied to flip-flop 510 to return it to the "zero" state. Thus, the time that flip-flop 510 is in the "one" state is directly related to the altitude of the transmitting aircraft. An output signal from flip-flop 510 is supplied to summing junction 504 where it is combined with the altitude recognition signal and supplied to the transmitter modulator on lead 52. The altitude signal then, consists of a number of pulses or a pulse code, here shown as five, to identify the signal followed by a pulse whose length is a measure of the transmitting aircraft altitude. The altitude signal is combined with the range signal previously discussed, and the sum is used to modulate the aircraft transmitter.

RANGE AND ALTITUDE MEASURING CIRCUITS

In the preceding sections specific decoding and synchronizing apparatus has been described; apparatus by which an aircraft in the system generates signals from which other aircraft in the system can determine a collision threat has also been described. In this section the apparatus for evaluation of the collision threat and apparatus for the display of this information will be discussed.

Figure 10:
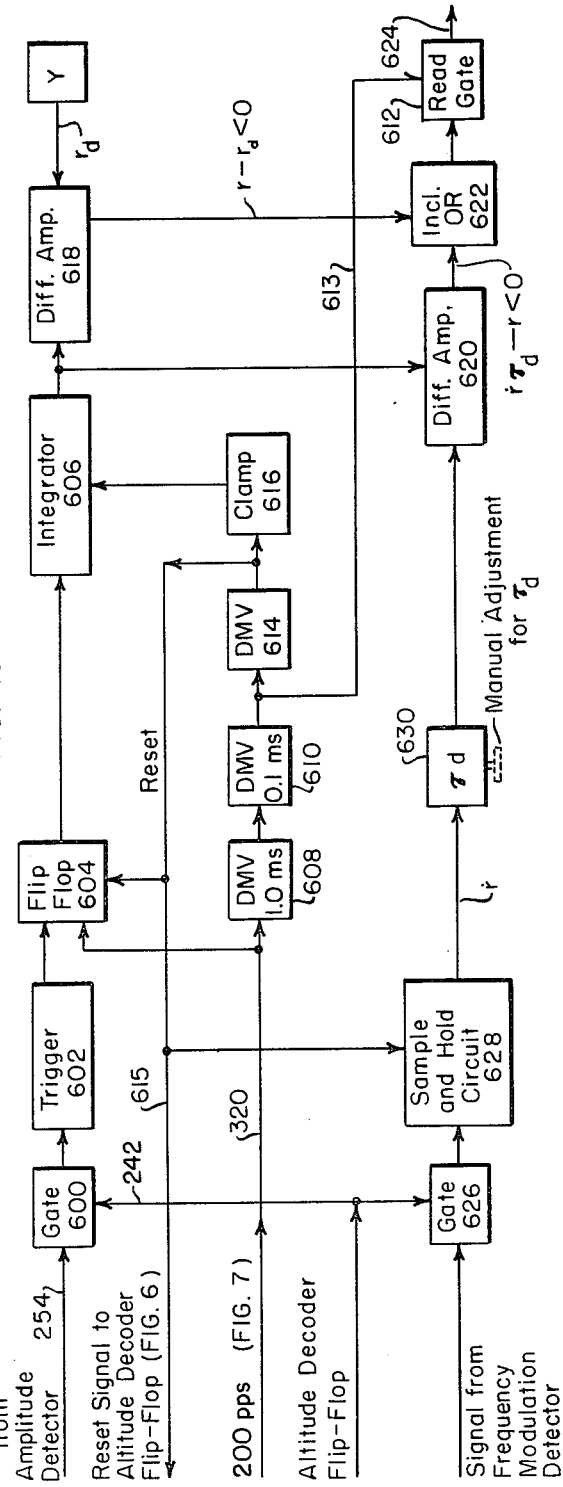
FIG. 10 is a block and line diagram of airborne apparatus for measuring the collision threat posed by other aircraft from received transmissions.

Apparatus for evaluation of the collision threat from range data is shown in FIG. 10. This apparatus is generally indicated at 66 and 72 in the overall block diagram of FIG. 3. As shown in FIG. 10, the range measuring circuit is shown in the upper part of the figure and the range rate measuring portion in the lower.

The range measuring circuit includes a gate 600 which is normally closed, but is opened by a signal from flip-flop 240 (FIG. 6) on lead 242 indicating the altitude code has been received. The output of the receiver amplitude detector is supplied to this gate and, when open is passed to the trigger circuit 602. This trigger is amplitude sensitive and responds only to the large sharp spike appearing at the end of each aircraft's transmission.

A flip-flop 604 is provided which is set to its "one" state at the beginning of each "slot" by the pulses in the 200 pulse per second pulse train appearing at the output of the digital divider 316 on the lead 320 (FIG. 7). The received range spike, which is transmitted from the intruder aircraft in exact coincidence with the pulses of the pulse train, is supplied to the flip-flop 604, causing it to change from its "one" back to its "zero" state. The length of the output pulse from flip-flop 604 is then equal to the time of transmission of the signal from the transmitting aircraft to the receiving aircraft. This pulse length is measured by supplying it to integrator 606. The final voltage reached by integrator 606 corresponds to the aircraft range.

At the beginning of each "slot," in addition to setting flip-flop 604 to its "one" state, a delay multivibrator 608 is triggered. Multivibrator 608 produces a sharp pulse after a fixed delay, in this case 1 millisecond. It is assumed that all range measurements of interest will be made in this one millisecond period, as noted previously, 1 millisecond corresponds to a range of about 160 miles. Thereafter, a delay multivibrator 610 which generates a pulse 0.1 millisecond in length is triggered by the pulse supplied by delay multivibrator 608. This pulse determines the "read" period when the voltages which measure a threat of collision are supplied to the computer and indicator through the opening of gate 612 by the signal appearing on lead 613. At the end of the 0.1 millisecond period another delay multivibrator 614 is energized. After a very short period it generates a signal which is used to reset the various flip-flops and clamp the integrators in the measuring circuits (both range and altitude) to their initial values. Thus the output signal from the delay multivibrator 614 is supplied via lead 615 to the clamp circuit 616 associated with integrator 606 and also supplied as a reset signal to flip-flop 604 to insure that it is reset to its "zero" state for the next measurement.

The voltage representative of the range, the output signal from integrator 606, is supplied to differential amplifiers 618 and 620. Amplifier 618 is also supplied with a voltage corresponding to the minimum range $r_d$ below which a collision threat is to be indicated. The difference between the measured range $r$ and the minimum range $r_d$ is supplied to an inclusive "or" circuit 622, to which is also supplied a signal indicative of the collision threat as measured by the $\tau$ criterion. If either of these signals has a polarity indicating that the criterion has been exceeded e.g. the measured range is below the minimum or the range rate times the minimum $\tau$ exceeds the range, the opening of the read gate passes the signal to the computation and indication circuits via lead 624.

The range rate measuring circuit includes a gate 626 controlled by the altitude flip-flop signal on lead 242. Gate 626 is supplied with the voltage from the frequency modulation detector 64 of FIG. 3. This voltage which is proportional in magnitude to the Doppler frequency shift and therefore the range rate, is passed by the gate 626 during the measuring period to a sample-and-hold circuit 628 which holds it available for measurement. The output of the sample-and-hold circuit is supplied to a potentiometer 630 or other manual voltage adjusting means. The minimum value of $\tau$, $\tau_d$, is manually set into this adjusting means to provide the product $\dot{r}\tau_d$. The difference between this quantity and the measured range is taken by the difference amplifier 620 and is also supplied to the inclusive "or" circuit 622. If either the minimum range or the $\tau$ criterion indicate a collision threat, or if both do, the signal passed by the read gate will be of a polarity to indicate that a collision threat is present.

As is apparent from FIG. 10, the sample and hold circuit 628 is reset by the range reset signal supplied by the delay multivibrator 614 on lead 615.

Figure 11:
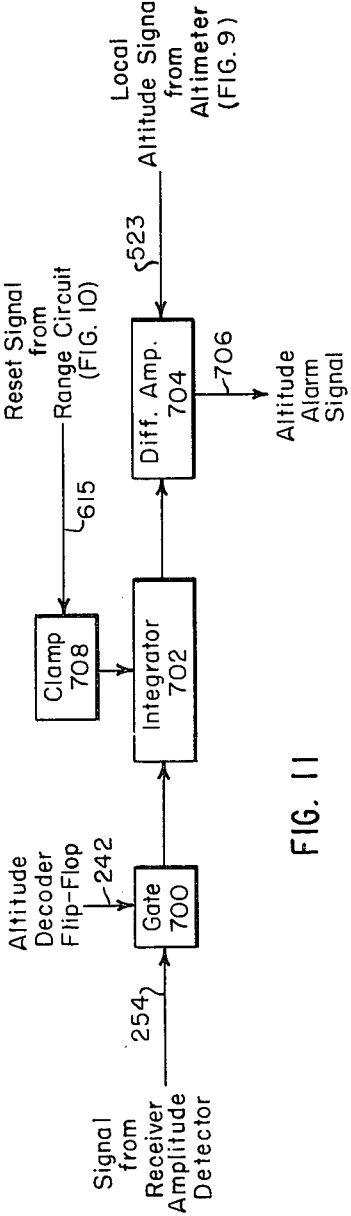
FIG. 11 is a block and line diagram of apparatus for measuring the altitude difference between all transmitting aircraft and the protected aircraft.

FIG. 11 illustrates apparatus for measuring the difference in altitude between the transmitting and receiving aircraft. The output signal from the receiver amplitude modulation detector is supplied to gate 700 which is controlled by the state of the altitude flip-flop 240. The gate 700 is opened when the five altitude pulses of each aircraft transmission are received and it passes the altitude pulse to the integrator 702. It will be recalled that the altitude pulse length transmitted by each aircraft is a measure of the altitude of the transmitting aircraft. Accordingly, if the pulse is integrated, the integrated voltage will be a measure of the transmitting aircraft's altitude. The integrated output voltage is supplied to a difference amplifier 704 which is also supplied with a voltage proportional to the receiving aircraft's altitude on lead 523. The polarity of the output of difference amplifier 704 will indicate whether the transmitting aircraft is above or below the receiving aircraft, and the magnitude of the difference voltage will be proportional to the altitude separation. The signal from the difference amplifier 704 is supplied to the computation and display circuits on lead 706.

Integrator 702 is clamped to an initial value by the clamp circuit 708 which in turn is activated by the range reset signal appearing on lead 615.

We have shown the computation and display circuits for the receiving aircraft in FIG. 12. As shown therein four difference amplifiers 800, 802, 804 and 806 are provided. The altitude difference signal is supplied via lead 706 as one input to each of these amplifiers. Amplifier 800 also has supplied thereto a fixed voltage corresponding in polarity and magnitude to an altitude difference of a transmitting aircraft at some upper limit, for example 1,000 feet, above the receiving aircraft. Amplifier 802 has an upper "tolerance" voltage, supplied to it. This might be for example a voltage corresponding in amplitude and polarity to a 300 foot separation between transmitting and receiving aircraft, the transmitting aircraft being above the receiving aircraft. Amplifier 804 has a fixed voltage of the same magnitude but of opposite polarity supplied to it and amplifier 806 has a voltage of opposite polarity but the same magnitude as that supplied to amplifier 800. Amplifiers 802 and 804 supply their output signals to an "and" circuit 808 which in turn controls gate 814 directly. The output signals from amplifiers 800 and 806 are supplied through "and" circuits 812 and 810 respectively as control signals for gates 818 and 816.

The signal from the range measuring circuit is supplied to gates 814, 816 and 818 during the "read" period and, if these gates are open is passed to the delay multivibrators 820, 822 and 824. If the range signal is of a polarity indicating no collision threat, the delay multivibrators do not operate and the green lights 826, 828 and 830 are lighted. However, if the multivibrators change state, the green lights will be extinguished and one or more of the red lights 832, 834 or 836 will be lighted. The delay multivibrators 820, 822 and 824, once operated, remain operated for one second.

The circuit of FIG. 12 operates in the following manner. For convenience of explanation it will be assumed that the polarity of the altitude voltage is positive if the transmitting aircraft is above the receiving aircraft and negative if it is below it and that the amplifier output signal in each case is obtained by subtracting the signal on lead 706 from the fixed amplifier input signal.

Thus, if the altitude separation of the transmitting and receiving aircraft is zero, there will be both a positive and negative signal supplied to the "and" circuit 808. When signals of different polarity are supplied to the "and" circuit it provides an output signal which opens gate 814. If, during the period that gate 814 is open (and it will remain open until the range reset signal is generated, if opened at all) a signal of polarity indicating a collision threat is supplied on lead 624, this signal will be passed by gate 814 to operate the delay multivibrator 822. Operation of multivibrator 822 extinguishes green light 828 and operates red light 834, indicating a collision threat at the aircraft's altitude. The "and" circuit 808 will open gate 814 for any aircraft which transmits an altitude signal which results in an altitude difference signal of less than three hundred feet on lead 706. If the received altitude signal is from an aircraft more than 300 above the receiving aircraft, the output of amplifiers 802 and 804 will both be of negative polarity and gate 814 will be closed. Conversely if, the transmitting aircraft is more than 300 feet below the receiving aircraft, then both amplifiers 802 and 804 will have positive outputs and gate 814 will remain closed. Thus operation of delay multivibrator 822 indicates an aircraft with an altitude separation of less than three hundred feet is presenting a collision threat.

The function of amplifier 800 and its associated circuitry is to indicate whether any aircraft in the air space immediately above the aircraft e.g. in the air space 300 to 1000 feet above it presents a collision threat. Similarly amplifier 806 and its associated circuitry monitor the air space below the receiving aircraft. Thus, if a collision threat is presented at the altitude of the receiving aircraft, the aircraft pilot has immediately available to him information as to whether it is safe to evade by climbing or diving.

For aircraft above the 300 foot upper tolerance level the output of amplifier 802 will be negative and for aircraft above the 1000 foot upper limit, the output of amplifier 800 will also be negative. Thus, for aircraft at altitudes greater than 1000 feet above the receiving aircraft gate 818 will remain closed since it is controlled by "and" circuit 812 which is similar to circuit 808. For aircraft at less than 1000 feet but greater than 300 foot separation, the output of amplifier 800 will be positive and gate 818 will be opened, passing any collision threat signal posed by that aircraft to the multivibrator 824 and causing it to operate. For aircraft at altitudes lower than 300 feet above the receiving aircraft, both amplifiers 800 and 802 have positive outputs and gate 818 is therefore closed.

"And" circuit 810 and gate 816 operate in the same fashion as described above for aircraft in the air space 300 to 1000 feet below the receiving aircraft.

It will be apparent that additional altitude levels may be monitored by providing additional difference amplifiers such as amplifiers 800 and 806 and providing them with fixed inputs corresponding to the outer limits between which it is desired to monitor the presence of transmitting aircraft and the altitude difference signal appearing on lead 706. The associated "and" circuit in each case would be supplied from the output of the additional difference amplifier and the amplifier next below (or above) it and a gate and delay multivibrator similar to that shown in FIG. 12 is provided for each monitored level.

It will thus be seen that we have provided an improved collision avoidance system for use by aircraft which depends for its operation upon time synchronization of all aircraft in the system. A precise frequency standard is not required however, all aircraft "clocks" being automatically synchronized from a central ground station. The system of our invention uses one way transmissions between aircraft, and obtains full spherical coverage around the protected aircraft. Because only one transmission at a time is taking place from any aircraft in the system the possibility of garbled transmission because of multiple simultaneous transmissions is substantially eliminated. By the use of the systems of our invention many airplanes can be apprised of the collision threat with all other aircraft in the range of interest. The airborne equipment for use in the system of our invention is conventional electronic equipment and if made utilizing modern construction techniques, will be compact and reliable in operation. Further, only four manual adjustments are provided for the pilot, minimum range and minimum $\tau$ which will not vary substantially once set in accordance with operational conditions and the manual reset and slot assignment controls. The collision threat indicator is of the "go-no-go" type and requires no decision by the pilot. Finally by measuring range and range rate, from the same transmitted waveform, a collision threat can be evaluated both by the $\tau$ and the minimum range criteria, and if either indicate a collision thereat, an indication will be supplied. Finally, because altitude information is transmitted by each aircraft in the system, the collision threat can be fully evaluated at the protected aircraft's own altitude as well as at altitude above and below the aircraft to give full information to the pilot.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A system for indicating the threat of collision between at least two relatively mobile stations comprising means for keeping time at said stations, means for transmitting radio frequency signals from a first of said stations at a predetermined time, means at a second of said stations for receiving said signals, means at said second station for determining the travel time of the received signal, means to derive an indication of the range between said stations from said travel time, and means at said second station to derive an indication of the rate of change of range of said stations from said received signal, and means for evaluating the threat of collision between said stations from said range and range rate information.

2. The combination defined in claim 1 in which the rate of change of range of said stations is measured at said second station by measuring the Doppler shift in frequency of said received signal.

3. The combination defined in claim 1 in which said time keeping means at each of said stations generate a time synchronized pulse train, said transmitted signal including a pulse coincident with one pulse of said pulse train, and means in said second station for generating a signal whose amplitude depends upon the time difference between the pulse of said synchronized pulse train which is coincident with said transmitted pulse, and the time said transmitted pulse is received, to thereby measure the range of said transmitting station.

4. A system for indicating the threat of collision between at least two relatively mobile stations comprising means for keeping time at said stations, said timing time keeping means generating a pulse train at each of said stations synchronized with the pulse trains in the other stations in the system, means for transmitting a signal including a pulse coincident with one pulse of said pulse train from a first of said stations at a predetermined frequency, means at a second of said stations for receiving said transmitted signals, means in said second station for generating a signal related to the time difference between the pulse of said synchronized pulse train in said second station which is coincident with said transmitted pulse and the time said transmitted pulse is received to thereby measure the range to said transmitting station, means in said second station for measuring the rate of change of range between said first and second stations by measuring the Doppler shift in frequency of said received signal, and means for evaluating the threat of collision between said stations from said range and range rate information.

5. The combination defined in claim 4 in which said means for evaluating said collision threat includes means for taking the ratio of range to range rate and means for comparing this ratio to a predetermined value of this ratio.

6. The combination defined in claim 4 in which the signal transmitted by said first station includes information as to the altitude of said first station, and means in said second station for determining the relative altitude of said first station with respect to said second station from said transmitted information.

7. A system for indicating the threat of collision between a plurality of aircraft comprising in combination a time standard in each of said aircraft, said time standard generating a master pulse train at each of said aircraft, said pulse train being synchronized with the master pulse trains in each of the other aircraft in said system, a transmitter in each of said aircraft, means responsive to said master pulse train causing each of said aircraft to transmit during one period of said master pulse train when no other aircraft in said system is transmitting, said transmitted signal including a pulse coincident with one pulse of said master pulse train, means in each of said aircraft for receiving the transmitted signals from all other aircraft in the system, means for measuring the range to each aircraft in said system by measurement of the time lapse between the pulse of said master pulse train next preceding reception of an aircraft pulse and the time said pulse is received, means in each of said aircraft for measuring the rate of change of range between all other aircraft in said system and said aircraft, and means for evaluating the threat of collision between said aircraft and all other aircraft from said range and range rate measurements.

8. The combination defined in claim 7 in which said time standard in each aircraft produces a fixed frequency signal substantially identical in frequency with the signals produced in all other aircraft in said system, said fixed frequency signal controlling the transmitter frequency in each of said aircraft, and means for successively measuring rate of change of range between said aircraft and all other aircraft in said system by measurement of the Doppler shift in frequency of the signals received from each of said other aircraft.

9. The combination defined in claim 7 which includes a transponder in each of said aircraft a ground station, said ground station including a time standard, a transmitter, a receiver, means for generating synchronizing signals for each airborne time standard said generating means being controlled by signals received by said receiver from said transponder to thereby measure range to said aircraft and means in each of said aircraft responsive to said synchronizing signal for causing said airborne time standard to be synchronized with the time standard in said ground station.

10. The combination defined in claim 8 in which each of said aircraft includes means for modulating said transmitted signal with altitude information, and means in each aircraft responsive to said received altitude signals for successively measuring the relative altitude of all other aircraft in said system, said relative altitude measurement being used in evaluation of said collision threat.

11. A system for indicating the threat of collision between a plurality of aircraft comprising, in combination, a ground station and a plurality of airborne stations one airborne station being in each of the aircraft between which the threat of collision is to be evaluated; said ground station including a stable frequency standard, means for generating a plurality of signals from the signal supplied by said standard, means for transmitting said signals to said aircraft, a transponder in each of said aircraft responsive to said transmitter signal means for receiving the signals from the transponder in each of said aircraft, means for determining the range between each of said aircraft and said ground station, from said received transponder signals and means controlled by the range to each aircraft as determined from said transponder signal for transmitting a synchronizing signal to each of said aircraft; each of said airborne stations including a frequency standard, a receiver, a transmitter, synchronizing means whereby said airborne frequency standard may be synchronized to said ground station frequency standard in accordance with the synchronizing signal transmitted by said ground station thereto, means for modulating said aircraft transmitter with a signal at a predetermined time, said time being characteristic of said transmitting aircraft whereby other aircraft in the system can evaluate the collision threat posed by the transmitting aircraft, means in said airborne station for receiving transmissions from other aircraft, means for measuring range and rate of change of range between each transmitting aircraft and the receiving aircraft from said received transmissions and means for measuring the collision threat posed by each of said transmitting aircraft based on said range and range rate measurements.

12. The combination defined in claim 11 in which each of said airborne stations include means for modulating said transmitter with information as to the altitude of the transmitting aircraft and means for determining the relative altitude of other aircraft in the system from the signals received therefrom.

13. The combination defined in claim 11 in which said range measurement in said aircraft is based on the time elapsed between the time of transmission of a signal from the transmitting aircraft and the time of reception of said signal in each of the receiving aircraft.

14. The combination defined in claim 11 in which said range rate measurement in said aircraft is made by measuring the Doppler shift in frequency of the signal received by each of said aircraft from other aircraft in the system.

15. The combination defined in claim 11 in which each of said aircraft includes means for generating a master pulse train from said frequency standard the master pulse train in each said aircraft being synchronized with the master pulse train in all other aircraft, the signal transmitted by each of said aircraft including a range pulse coincident with one pulse of said master pulse train, and in which said range measuring means includes means for generating a range signal proportional to the difference in time between the pulse of said master pulse train in said aircraft next preceding the reception of a range pulse from another aircraft and the time of reception of said range pulse.

16. The combination defined in claim 11 in which said collision threat measuring means includes means for determining whether said measured range is less than a predetermined minimum range and means for determining whether said measured rate of change of range multiplied by a predetermined constant $\tau_d$ is less than the measured range, and means for indicating a collision threat if either one or both of these conditions exist.

17. The combination defined in claim 11 in which each of said airborne stations includes means for modulating said transmitter with information as to the altitude of the transmitting aircraft, and means for determining the relative altitude of other aircraft in the system from signals received therefrom, and in which said collision threat measuring means includes means for determining whether said measured range is less than a predetermined minimum range and means for determining whether said measured rate of change of range multiplied by a predetermined constant $\tau_d$ is less than the measured range, and which includes means for indicating a collision threat if either one or both of said conditions exist, the relative altitude of the aircraft posing the collision threat being displayed by said indicating means.

18. A system for indicating the threat of collision between a plurality of aircraft comprising, in combination, a ground station and a plurality of airborne stations, one airborne station being in each of the aircraft between which the threat of collision is to be evaluated; said ground station including a stable frequency standard, means for generating a plurality of signals from the signal supplied by said standard, means for transmitting said signals to said aircraft, a transponder in each of said aircraft responsive to said transmitter signal means for receiving signals from the transponder in each of said aircraft, means for determining the range between each of said aircraft and said ground stations from said received transponder signals, and means controlled by the range to each aircraft as determined from said transponder signal for transmitting a synchronizing signal to each of said aircraft dependent on its range from said ground station; each of said airborne stations including a frequency standard, said frequency standard controlling a fixed frequency signal and a master pulse train, a receiver, a transmitter, synchronizing means whereby said airborne frequency standard may be synchronized to said ground station frequency standard in accordance with the synchronizing signals transmitted by said ground station thereto, thereby synchronizing said fixed frequency signal and said master pulse train in each of said airborne stations, means for transmitting a signal from each aircraft in said system at a predetermined periodic time, said transmitted signal being controlled in frequency by said fixed frequency signal, and including information as to the altitude of said transmitting aircraft and also including a range pulse coincident with one of the pulses of said master pulse train, whereby other aircraft in the system can evaluate the collision threat posed by the transmitting aircraft, means in said airborne stations for receiving transmissions from other aircraft, means for measuring range and rate of change of range between each transmitting aircraft from the signals transmitted by other aircraft, said range measuring means including means for generating a range signal proportional to the difference in time between the pulse of said master pulse train next preceding the reception of a range pulse from another aircraft and the time of reception of said range pulse, said rate of change of range measuring means including means for measuring the Doppler shift in frequency of said received signal, means for determining the relative altitude of other aircraft in the system from the signals received therefrom, and means for measuring and indicating the collision threat posed by each of said transmitting aircraft, said collision threat measuring means including means for determining if said measured range is less than a predetermined minimum range, means for determining if the measured rate of change of range multiplied by a predetermined constant $\tau_d$ is less than the measured range, said indicating means displaying a collision threat if either one or both of these conditions exist, said indicating means also displaying the relative altitude of any aircraft posing a collision threat.

References Cited in the file of this patent

UNITED STATES PATENTS 3,068,473    Muth  ---------------- Dec. 11, 1962